US012608740B2

(12) United States Patent　　　　　　(10) Patent No.: US 12,608,740 B2
Park et al.　　　　　　　　　　　　　　(45) Date of Patent: Apr. 21, 2026

(54) GRAPHICAL USER INTERFACE FOR ORDER ENTRY WITH HOVERING FUNCTIONALITY

(71) Applicant: BGC PARTNERS, L.P., New York, NY (US)

(72) Inventors: Harris Park, New York, NY (US); Eric Hirschhorn, New York, NY (US)

(73) Assignee: BGC PARTNERS, L.P., New York, NY (US)

( * ) Notice: Subject to any disclaimer, the term of this patent is extended or adjusted under 35 U.S.C. 154(b) by 0 days.

(21) Appl. No.: 18/138,177

(22) Filed: Apr. 24, 2023

(65) Prior Publication Data

US 2023/0260011 A1　　Aug. 17, 2023

Related U.S. Application Data

(63) Continuation of application No. 17/567,218, filed on Jan. 3, 2022, now Pat. No. 11,669,891, which is a continuation of application No. 16/673,007, filed on Nov. 4, 2019, now Pat. No. 11,216,866, which is a continuation of application No. 15/868,611, filed on Jan. 11, 2018, now Pat. No. 10,482,526.

(60) Provisional application No. 62/445,039, filed on Jan. 11, 2017.

(51) Int. Cl.
*G06F 3/0482*　　(2013.01)
*G06F 3/04812*　　(2022.01)
*G06F 3/04847*　　(2022.01)
*G06F 3/0489*　　(2022.01)

*G06Q 30/0601*　　(2023.01)
*G06Q 30/08*　　(2012.01)

(52) U.S. Cl.
CPC ..... *G06Q 30/0641* (2013.01); *G06F 3/04812* (2013.01); *G06F 3/0482* (2013.01); *G06F 3/04847* (2013.01); *G06F 3/0489* (2013.01); *G06Q 30/08* (2013.01)

(58) Field of Classification Search
CPC .......................... G06Q 30/0641; G06Q 30/08; G06F 3/04812; G06F 3/0482; G06F 3/04847; G06F 3/0489
See application file for complete search history.

(56) References Cited

U.S. PATENT DOCUMENTS

| | | | | |
|---|---|---|---|---|
| 7,949,954 B1 * | 5/2011 | Jezek, Jr. | .............. | G06F 3/0481 |
| | | | | 705/37 |
| 8,600,861 B2 * | 12/2013 | Rutt | ....................... | G06Q 40/06 |
| | | | | 705/37 |
| 2003/0004862 A1 * | 1/2003 | Lutnick | ................... | G06Q 40/00 |
| | | | | 705/37 |
| 2007/0156565 A1 * | 7/2007 | Singer | .................... | G06Q 40/04 |
| | | | | 705/37 |
| 2007/0156570 A1 * | 7/2007 | Singer | .................... | G06Q 40/06 |
| | | | | 705/37 |
| 2008/0052220 A1 * | 2/2008 | Rutt | ....................... | G06Q 40/04 |
| | | | | 705/37 |
| 2008/0228633 A1 * | 9/2008 | Kalt | .................... | A43B 23/087 |
| | | | | 705/37 |

(Continued)

*Primary Examiner* — Hien L Duong

(57)　　　　　ABSTRACT

Disclosed herein are an apparatus, method, and non-transitory computer readable medium that improves the functioning of the computer. A drop down menu with different options may be rendered for an order associated with a product on which a cursor hovers. In response to a selection of a parameter option, an order for a product is transmitted.

19 Claims, 4 Drawing Sheets

(56)                    References Cited

U.S. PATENT DOCUMENTS

| 2009/0043664 | A1* | 2/2009 | Lutnick | G06Q 50/188 |
| | | | | 705/26.4 |
| 2011/0320337 | A1* | 12/2011 | Buck | G06F 3/0482 |
| | | | | 705/37 |
| 2011/0320361 | A1* | 12/2011 | Foley | G06Q 50/188 |
| | | | | 705/80 |
| 2012/0265664 | A1* | 10/2012 | Triplett | G06Q 30/08 |
| | | | | 705/37 |
| 2014/0157100 | A1* | 6/2014 | Evans | G06F 40/177 |
| | | | | 715/227 |

* cited by examiner

100

300

RENDER GRAPHICAL USER INTERFACE — 302

DETECT A FIRST INPUT — 304

IN RESPONSE TO FIRST INPUT, CHANGE STATUS INDICATOR — 306

DETECT A MOVEMENT OF THE CURSOR OVER A GIVEN ROW — 308

IN RESPONSE TO CURSOR HOVERING OVER THE GIVEN ROW, RENDER DROP DOWN BOX WITH DIFFERENT SIZE OPTIONS — 310

DETECT A SELECTION OF A SIZE OPTION — 312

IN RESPONSE TO SELECTION, TRANSMIT ORDER WITH SELECTED SIZE — 314

GRAPHICAL USER INTERFACE FOR ORDER ENTRY WITH HOVERING FUNCTIONALITY

CROSS-REFERENCE TO RELATED APPLICATIONS

This application is a continuation of U.S. patent application Ser. No. 17/567,218 filed Jan. 3, 2022, which is a continuation of U.S. patent application Ser. No. 16/673,007 filed Nov. 4, 2019 (now U.S. Pat. No. 11,216,866 issued Jan. 4, 2022), which is a continuation application of U.S. patent application Ser. No. 15/868,611 filed Jan. 11, 2018 (now U.S. Pat. No. 10,482,526 issued Nov. 19, 2019), which claims priority to U.S. Provisional Application 62/445,039 filed Jan. 11, 2017, the disclosures of which are hereby incorporated by reference herein in its entirety.

BACKGROUND

Advances in computing and networking technology allow electronic trades to be received and executed in fractions of a second. Computing devices may generate trades that move in and out of short term positions at high volumes and high speeds to exploit small price changes.

SUMMARY

Figure 1:
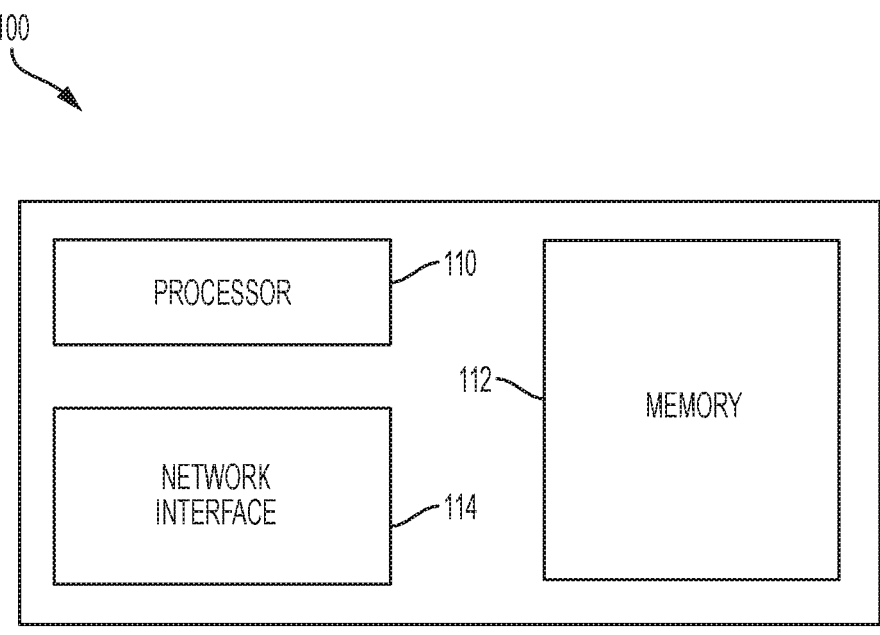
FIG. 1 is an example apparatus in accordance with aspects of the present disclosure.

As noted above, networked computers may execute trades at unprecedented speeds. Unfortunately, the speeds at which these trades are executed pose new technical challenges and risks. The rapid price changes that occur due to network velocity make it difficult for traders to capture a desired price. Entering order parameters in conventional systems is cumbersome and time consuming. The problem of elusive prices specifically arises in the realm of computer networking technology, since volatile price changes may occur while a trader enters order parameters due to the speed of the electronic trading network.

In view of the foregoing, disclosed herein are technical improvements to the functioning of the computer that significantly reduce the time it takes to enter an order via a graphical user interface ("GUI").

In one example, disclosed herein is an apparatus that may include a display screen, a network interface, a memory device, and at least one processor. The at least one processor may execute the following operations: render on the display screen a graphical user interface having a plurality of rows, each row having a product field, a price field, and a size field; detect actuation of a first input; in response to detecting actuation of the first input, change a status indicator stored in the memory device to indicate that a cursor is about to hover over a given row of the plurality of rows; detect a movement of the cursor over the given row; in response to detecting the cursor hovering over the given row, render a drop down menu with different size options for an order associated with the given row on which the cursor hovers; detect a selection of a size option in the drop down menu; and in response to the selection of the size option, transmit, via the network interface, an order for a product specified in the product field of the given row with a size corresponding to the selected size option.

In a further example, a method is disclosed. The method may include the following: rendering, by at least one processor, on a display screen, a graphical user interface having a plurality of rows, each row having a product field, a price field, and a size field; detecting, by the at least one processor, actuation of a first input; in response to detecting actuation of the first input, changing, by the at least one processor, a status indicator stored in a memory device to indicate that a cursor is about to hover over a given row of the plurality of rows; detecting, by the at least one processor, a movement of the cursor over the given row; in response to detecting the cursor hovering over the given row, rendering, by the at least one processor, a drop down menu with different size options for an order associated with the given row on which the cursor hovers; detecting, by the at least one processor, a selection of a size option in the drop down menu; and in response to the selection of the size option, transmitting, by the at least one processor, an order via a network interface for a product specified in the product field of the given row with a size corresponding to the selected size option.

In yet another example, disclosed herein is a non-transitory computer-readable medium with instructions stored therein. When executed, the instructions may cause at least one processor to: render on the display screen a graphical user interface having a plurality of rows, each row having a product field, a price field, and a size field; detect actuation of a first input; in response to detecting actuation of the first input, change a status indicator stored in the memory device to indicate that a cursor is about to hover over a given row of the plurality of rows; detect a movement of the cursor over the given row; in response to detecting the cursor hovering over the given row, render a drop down menu with different size options for an order associated with the given row on which the cursor hovers; detect a selection of a size option in the drop down menu; and in response to the selection of the size option, transmit, via the network interface, an order for a product specified in the product field of the given row with a size corresponding to the selected size option.

The aspects, features and advantages of the present disclosure will be appreciated when considered with reference to the following description of examples and accompanying figures. The following description does not limit the application; rather, the scope of the disclosure is defined by the appended claims and equivalents.

DETAILED DESCRIPTION

FIG. 1 presents a schematic diagram of an illustrative computer apparatus 100 for executing the techniques disclosed herein. Computer apparatus 100 may comprise any device capable of processing instructions and transmitting data to and from other computers, including a laptop, a full-sized personal computer, a high-end server, or a network computer lacking local storage capability. Computer apparatus 100 may include a keyboard and mouse and/or various other types of input devices such as pen-inputs, joysticks, buttons, touch screens, etc., as well as a display device, which could include, for instance, a CRT, LCD, plasma screen monitor, TV, projector, etc. Computer apparatus 100 may also comprise a network interface 114 to communicate with other devices over a network. Although all the components of computer apparatus 100 are functionally illustrated as being within the same block, it will be understood that the components may or may not be stored within the same physical housing.

The computer apparatus 100 may also contain at least one processor 110, which may include, but is not limited to, central processing units (CPUs), microcontrollers, digital signal processors, application specific integrated circuits ("ASICS"), or any combination thereof. A processor may include an Intel® Pentium®, Centrino®, and/or Core® processor. Processor 110 may receive instructions (e.g., from memory device 112 or like device), and execute those instructions, thereby performing one or more processes defined by those instructions.

As noted above, memory device 112 may store instructions that may be retrieved and executed by processor 110. Memory device 112 may include, but is not limited to, non-volatile media, volatile media, and non-transitory computer readable media ("CRM"). Non-volatile media include, for example, optical or magnetic disks, read-only memory ("ROM"), and other persistent memory. Volatile media include dynamic random access memory, which may constitute the main memory of computer apparatus 100. Memory device 112 may also include any combination of one or more of the foregoing and/or other devices as well. While only one processor 110 and one memory device 112 are shown in FIG. 1, it is understood that computer apparatus 100 may actually comprise additional processors and memories that may or may not be stored within the same physical housing or location.

A non-transitory CRM may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, an erasable programmable read-only memory, a portable compact disc, a flash drive, or other storage devices that may be coupled to computer apparatus 100 directly or indirectly.

Figure 2:
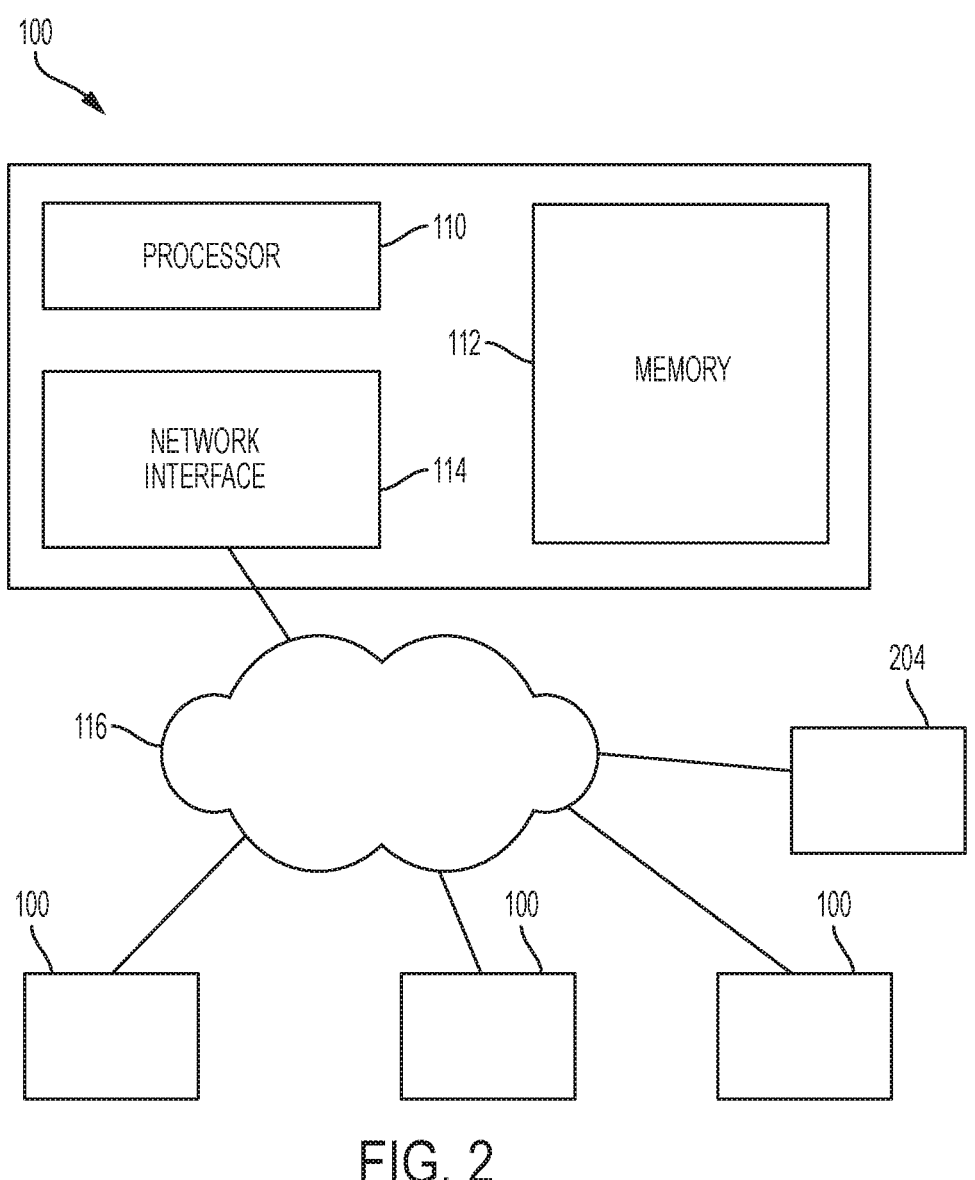
FIG. 2 is an example network in accordance with aspects of the present disclosure.

Turning now to FIG. 2, computer apparatus 100 is shown interconnected to other computer apparatus 100 via network interface 114 and network 116. Network 116 may be a local area network ("LAN"), wide area network ("WAN"), the Internet, etc. Network 116 and the intervening nodes thereof may use various protocols including virtual private networks, local Ethernet networks, and private networks using communication protocols proprietary to one or more companies, cellular and wireless networks, HTTP, and various combinations of the foregoing. Although only a few computers are depicted in the network of FIG. 2, it should be appreciated that a network may include additional interconnected computers and that the five computers shown in FIG. 2 are for ease of illustration. Each computer apparatus depicted in FIG. 2 may be an individual node in network 116. In this particular example, each computer apparatus 100 may be a client computer and computer apparatus 204 may be a server computer. The graphical user interfaces discussed below may be rendered on a given computer apparatus 100. In a further example, network 116 may form an electronic marketplace and computer apparatus 204 may monitor electronic trades entered at each computer apparatus 100 and match buy and sell orders entered at each computer apparatus 100. The network shown in FIG. 2 may be employed to trade any type of product including, but not limited to, financial products.

The instructions residing in memory device 112 may comprise any set of instructions to be executed directly (such as machine code) or indirectly (such as scripts) by processor 110. In this regard, the terms "instructions," "scripts," or "modules" may be used interchangeably herein. The computer executable instructions may be stored in any computer language or format, such as in object code or modules of source code. The instructions may be written in various programming languages, including an object-oriented programming language, such as SmallTalk, Java, C++, Ada, Python, or C # (C-Sharp), functional programming languages, scripting programming languages such as JavaScript, and/or logical programming languages. Furthermore, it is understood that the instructions may be implemented in the form of hardware, software, or a combination of hardware and software and that the examples herein are merely illustrative.

Figure 3:
FIG. 3 is a flow diagram of an example method in accordance with aspects of the present disclosure.
Figure 3:
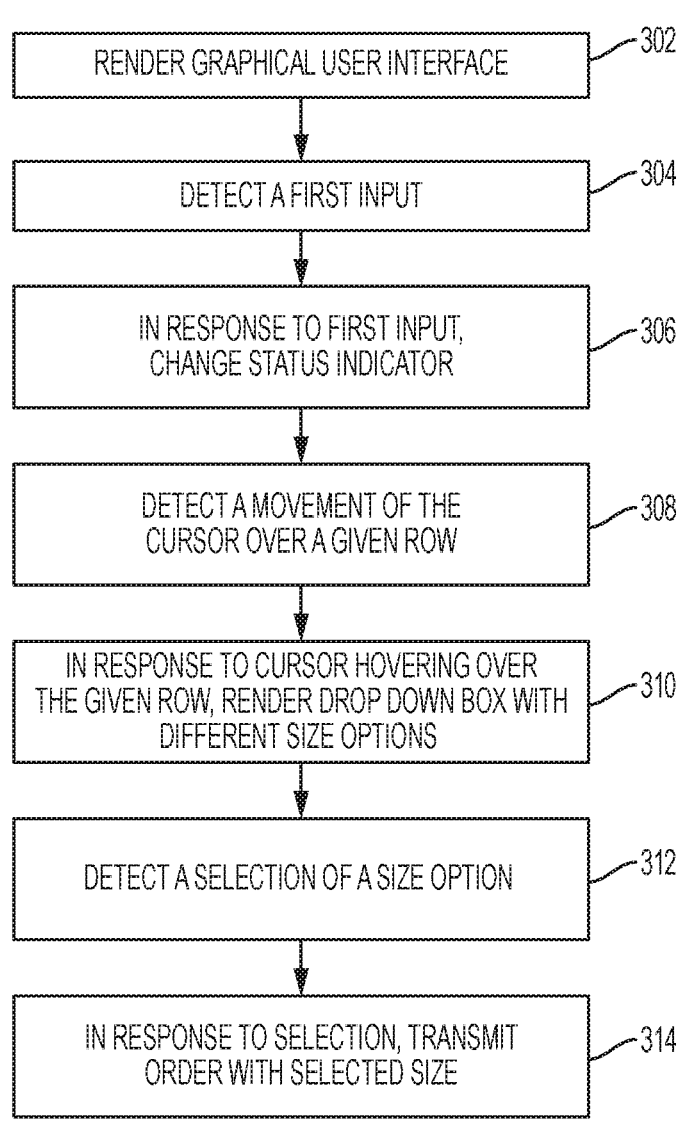
Figures 4A, 4B:
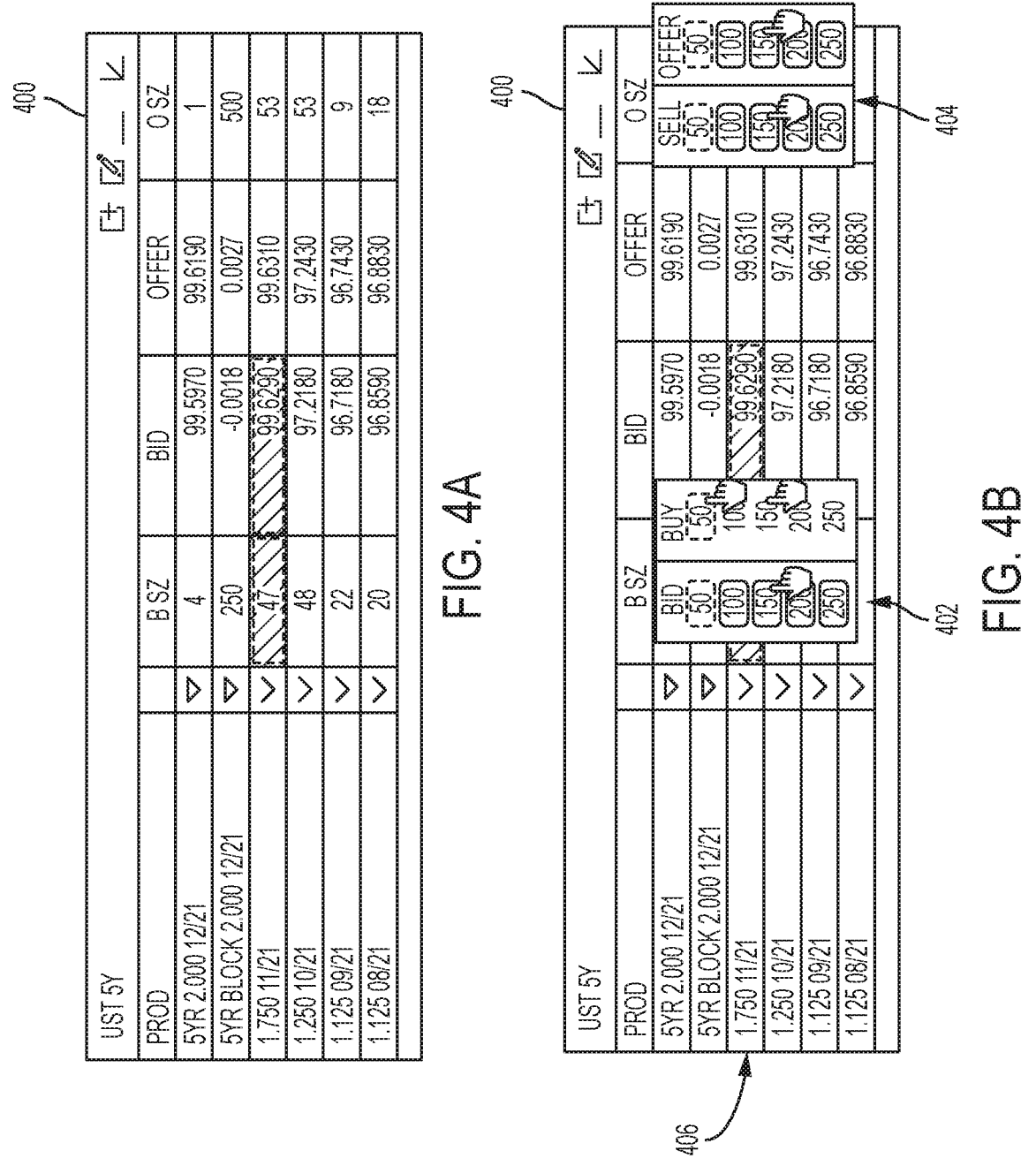
FIGS. 4A-4B illustrate a working example in accordance with aspects of the present disclosure.

An example of the technological improvements disclosed herein is shown in FIGS. 3-4B. In particular, FIG. 3 illustrates a flow diagram of an example method 300 for submitting an order using an improved GUI and FIGS. 4A-4B show a corresponding working example. The actions shown in FIGS. 4A-4B will be discussed below with regard to the flow diagram in FIG. 3.

Referring to FIG. 3, at block 302, processor 110 may render a graphical user interface on a display screen. In FIG. 4, an example GUI trading screen 400 is shown with six rows of market data for six different financial products. GUI trading screen 400 also shows five columns, which include a product field, a bid size field, a bid price field, an offer price field, and an offer size field. Referring back to FIG. 3, processor 110 may detect actuation of a first input, as shown in block 304. The first input may be, for example, the actuation of an "F1" key or "CTRL" key on a physical or virtual keyboard.

In a further example, processor 110 may generate a status indicator in memory device 112. The status indicator may be associated with the GUI trading screen 400. At block 306 of FIG. 3, in response to detecting actuation of the first input, processor 110 may change the status indicator in the memory device 112 to indicate that a cursor is about to hover over a given row of the plurality of rows. In one example, processor 110 may alter the status indicator associated with GUI trading screen 400 to indicate "hover mode." In FIG. 3, processor 110 may detect a movement of the cursor over a given row of GUI trading screen 400 while in the hover mode status, as shown in block 308. At block 310, in response to detecting the cursor hovering over the given row while the status indicator is in hover mode, processor 110 may render a drop down menu with different size options for a product associated with the given row on which the cursor hovers.

Referring now to FIG. 4B, GUI trading screen 400 is depicted in hover mode and a cursor is shown hovering over a row 406, which contains market data for a 5 year treasury bond product. In response to detecting the cursor hovering over row 406 while the status indicator is in hover mode, the example of FIG. 4B illustrates how processor 110 may render a bid/buy drop down menu 402 and a sell/offer drop down menu 404 associated with the hovered-over row. In FIG. 4B, bid/buy drop down menu 402 is superimposed over the bid size column and sell/offer drop down menu 404 is superimposed over the offer size column. In one example, bid/buy drop down menu 402 and a sell/offer drop down menu 404 may be transient hover windows that are rendered when the cursor hovers over a given row and removed when the cursor no longer hovers over the given row. Different size options are depicted in the drop down menus for a bid size, a buy size, a sell size, and an offer size. Furthermore, processor 110 renders bid/buy drop down menu 402 alongside the bid price column and renders sell/offer drop down menu 404 alongside the offer price column, so that price changes are easily ascertainable while the drop down menu selections are displayed. However, it is understood that bid/buy drop down menu 402 and sell/offer drop down menu 404 may be rendered in any location that permits the price changes to be observed.

Referring back to FIG. 3, processor 110 may detect a selection of one of the size options, at block 312. In the example of FIG. 4B, the lowest available size in both drop down menus is 50; the highest available size in both drop down menus is 250; and, other sizes in between are available in increments of 50. However, it is understood that these size options are merely illustrative and that other size options may be displayed. Referring back to FIG. 3, in response to the selection of one of the size options, processor 110 may transmit, via network interface 114, an order for a product specified in the product field of the row on which the cursor hovers with a size corresponding to the selected size, as shown in block 314. In the example of FIG. 4B, when processor 110 detects selection of a size in bid/buy drop down menu 402 or sell/offer drop down menu 404, processor 110 may transmit a new order with the selected size to server 204 via network 116. In a further example, processor 110 may transmit a new order each time a selection of a size on bid/buy drop down menu 402 or sell/offer drop down menu 404 is detected. That is, processor 110 may detect multiple size option selections and transmit orders corresponding to the multiple selections for the product specified in the product field. Moreover, processor 110 may replace any default bid/buy or sell/offer sizes stored in memory device 112 with the new size selected from bid/buy drop down menu 402 or sell/offer drop down menu 404. While the example of FIG. 3B depicts size options, it is understood that processor 110 may display drop down menus that permit selections of any other order parameter (e.g., order type).

In a further example, processor 110 may detect that the cursor moves and hovers over a different row while the status indicator is in hover mode. In response to detecting that the cursor moves and hovers over a different row, processor 110 may render a bid/buy drop down menu 402 and a sell/offer drop down menu 404 that is associated with the product represented by the different row. Processor 110 may continue rendering and updating bid/buy drop down menu 402 and sell/offer drop down menu 404 as the cursor is moved over different rows until a second input is detected. For example, if the detected first input was the "F1" key, processor 110 may cease rendering bid/buy drop down menu 402 and sell/offer drop down menu 404 when it detects a second actuation of the "F1" key. That is, the second input may cause processor 110 to change the status indicator stored in memory device 112 from hover mode to any other appropriate status. Once the status indicator is no longer populated with a hover mode indication, processor 110 may cease rendering the drop down menus, even when the cursor hovers over a row.

In yet another example, processor 110 may detect that the cursor moves outside GUI trading screen 400 while the GUI is in hover mode. In this instance, processor 110 may cease rendering bid/buy drop down menu 402 and sell/offer drop down menu 404 until the cursor is again moved over a row of GUI trading screen 400.

Allowing an order to be submitted to the network upon selection of a size or order parameter significantly reduces the time it takes to enter a trade. The order may be automatically submitted with the other order parameters (e.g., order type) pre-populated in the transmission. Other information for the order may be preconfigured so that a trader need not manually enter the other information each time an order is generated. This is an improvement over conventional computer technology that requires a trader to manually populate all the fields at the time of order entry. The placement of the drop down menus also permits a user to easily view the price fluctuations so that the user can make a selection when a desired price appears.

As noted above, while the examples herein show drop down menus that permit order submissions upon selection of a size, it is understood that the drop down menus may display options for a different order parameter. For example, the drop down menus may display different order type options. In this instance, an order may be submitted upon selection of an order type with a default or pre-configured size.

Advantageously, the above-described apparatus, non-transitory computer readable medium, and method allow order parameters to be entered and transmitted efficiently to mitigate the effects of market volatility. As noted above, such market changes may result from the speed at which modern electronic networks execute orders and updates market data. Rather than changing default parameters or dealing with a time consuming order changing process, the technology disclosed herein allows an order to be entered the instant a desired price appears on the screen. Accordingly, the present description discloses solutions to a problem in the software arts that arises in the realm of computer networking. The disclosed GUI solutions improve the functioning of technology by improving the accuracy of trader transactions.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure.

The invention claimed is:

1. An apparatus for performing electronic trading using a network connected computing device controlled by a user and having a display screen and at least one processor configured to:

render on the display screen a plurality of rows, each row displaying a unique tradeable product, and a plurality of fields including bid and offer price fields and bid and offer size fields that correspond to the unique tradeable product;

cause, in response to a user action, a movement of a cursor on the display screen to a first row of the plurality of rows; in response, superimpose over the first row a drop down menu having a plurality of rows with different respective size options for trading the unique tradeable product associated with the first row, wherein the drop down menu continues to be superimposed only while the cursor is over the first row, and price changes in the bid and offer price fields corresponding to the unique tradeable product of the plurality of rows are visible while the drop down menu is superimposed, wherein the drop down menu is displayed in a region superimposed over a plurality of the bid size fields or a plurality of the offer size fields and blocks visibility of all values previously displayed in the region;

select, in response to a user input, a first of the different respective size options; and in response, transmit, via the network, an order for the unique tradeable product specified in the first row and having a size corresponding to the first of the different respective size options.

2. The apparatus of claim 1, further comprising a keyboard having one or more keys, wherein the cursor responds to an actuation of a first key selected from the one or more keys on the keyboard.

3. The apparatus of claim 1, wherein the at least one processor is further configured to update information of the drop down menu superimposed on the display screen as the cursor is moved over different rows of the plurality of rows.

4. The apparatus of claim 1, wherein the different size options of the drop down menu are provided in increments, including increments of fifty.

5. The apparatus of claim 4, wherein fifty is a lowest available of the different size options.

6. The apparatus of claim 1, wherein two hundred and fifty is a highest available of the different size options.

7. The apparatus of claim 1, wherein the at least one processor is further configured to:

detect multiple selections of the different size options in the drop down menu; and transmit, via the network, multiple orders corresponding to the multiple selections corresponding to the different size options for the unique tradeable product associated with the first row.

8. The apparatus of claim 1, wherein:

the plurality of rows of the drop down menu include a first drop down menu row, a second drop down menu row and a third drop down menu row; and a difference in the size options between the first drop down menu row and the second drop down menu row is the same as that between the second drop down menu row and the third drop down menu row.

9. The apparatus of claim 1, wherein in each of the plurality of rows, a respective one of the bid size fields is displayed in a first column adjacent to a column of the bid price field, a respective one of the offer size fields is displayed in a second column adjacent to a column of the offer price field, and the drop down menu extends along an entirety of the first column or the second column.

10. A method for performing electronic trading using a network connected computing device controlled by a user and having a display screen and at least one processor, the method being performed by the least one processor and comprising:

rendering a plurality of rows on the display screen, each said row displaying a unique tradeable product, and a plurality of fields including bid and offer price fields and bid and offer size fields corresponding to the unique tradeable product;

causing, in response to a user action, a movement of a cursor on the display screen to one of the bid and offer size fields in a first row of the plurality of rows; in response, superimposing over the first row a drop down menu having a plurality of rows with different respective size options for trading the unique tradeable product associated with the first row, wherein price changes in the bid and offer price fields corresponding to the unique tradeable products of the plurality of rows are visible while the drop down menu is superimposed, and the drop down menu continues to be superimposed only while the cursor is over the first row, wherein the drop down menu is displayed in a region superimposed over a plurality of the bid size fields or a plurality of the offer size fields and blocks visibility of all values previously displayed in the region;

selecting, in response to a user input, a first of the different size options; and in response, transmitting, via the network, an order for the unique tradeable product specified in the first row and having a size corresponding to the first of the different respective size options.

11. The method of claim 10, further comprising using a keyboard connected to the computing device and having one or more keys, wherein the cursor responds to an actuation of a first key selected from the one or more keys on the keyboard.

12. The method of claim 10, further comprising updating information of the drop down menu as the cursor is moved over different rows of the plurality of rows.

13. The method of claim 10, wherein fifty is a lowest available size option of the different size options of the drop down menu.

14. The method of claim 10, wherein two hundred and fifty is a highest available size option of the different size options.

15. The method of claim 10, further comprising:

detecting, by the at least one processor, multiple selections of the different size options in the drop down menu; and transmitting, by the at least one processor, via the network, multiple orders corresponding to the multiple selections corresponding to the different size options for the unique tradeable product associated with the first row.

16. The method of claim 10, further comprising simultaneously displaying a buy side drop down menu and sell sides drop down menu associated with the first row, wherein price changes corresponding to the unique tradeable product of the plurality of rows are visible while the drop down menu is being displayed.

17. A non-transitory computer readable medium with instructions stored therein which, when executed by at least one processor, perform a method for performing electronic trading using a network connected computing device controlled by a user and having a display screen and the at least one processor, the method comprising:

rendering a plurality of rows on the display screen, each said row displaying a unique tradeable product, and a plurality of fields including bid and offer price fields and bid and offer size fields corresponding to the unique tradeable product;

causing, in response to a user action, a movement of a cursor on the display screen to one of the bid and offer size fields in a first row of the plurality of rows; in response, superimposing over the first row a drop down menu having a plurality of rows with different respective size options for trading the unique tradeable product associated with the first row, wherein price changes in the bid and offer price fields corresponding to the unique tradeable product of the plurality of rows are visible while the drop down menu is superimposed, and the drop down menu continues to be superimposed only while the cursor is over the first row, wherein the drop down menu is displayed in a region superimposed over a plurality of the bid size fields or a plurality of the offer size fields and blocks visibility of all values previously displayed in the region;

selecting, in response to a user input, a first of the different size options; and in response, transmitting, via the network, an order for the unique tradeable product specified in the first row and having a size corresponding to the first of the different respective size options.

18. The non-transitory computer readable medium of claim 17, wherein the method further comprising updating information of the drop down menu as the cursor is moved over different rows of the plurality of rows.

19. The non-transitory computer readable medium of claim 17, wherein the method further comprising simultaneously displaying a buy side drop down menu and a sell side drop down menu associated with the first row, wherein the price changes corresponding to the unique tradeable product of the plurality of rows are visible while the buy side drop down menu and the sell side drop down menu are being displayed.

* * * * *